(No Model.)

O. C. FRAME.
DEVICE FOR UNTYING BALE WIRES, &c.

No. 518,839. Patented Apr. 24, 1894.

Witnesses

Inventor
Oliver C. Frame
By John Wedderburn
his Attorney

UNITED STATES PATENT OFFICE.

OLIVER C. FRAME, OF PASADENA, CALIFORNIA.

DEVICE FOR UNTYING BALE-WIRES, &c.

SPECIFICATION forming part of Letters Patent No. 518,839, dated April 24, 1894.

Application filed August 17, 1893. Serial No. 483,387. (No model.)

*To all whom it may concern:*

Be it known that I, OLIVER C. FRAME, a citizen of the United States, and a resident of Pasadena, in the county of Los Angeles and State of California, have invented certain new and useful Improvements in Devices for Loosening or Untying Bale-Wires or Bale-Ties; and I do hereby declare the following to be a full, clear, and exact description of the invention, such as will enable others skilled in the art to which it appertains to make and use the same.

This invention relates to devices for loosening or untying bale wires or bale ties, and has for its object to provide simple and convenient means which will facilitate the said operation and insure a quick accomplishment of the same.

With these and other objects in view the invention consists of the construction and arrangement of the several parts, which will be more fully hereinafter described and claimed.

Figure 1:
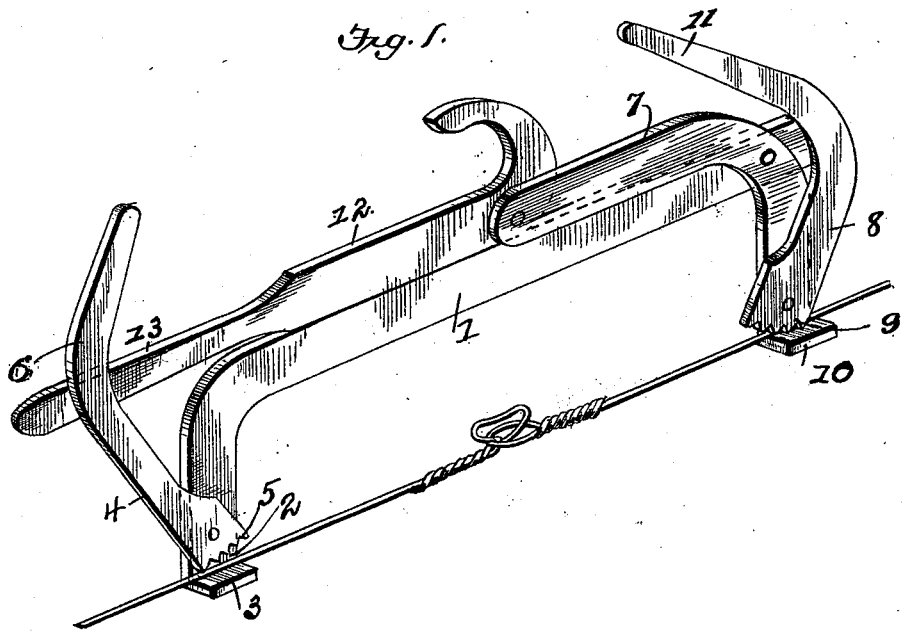
Figure 2:
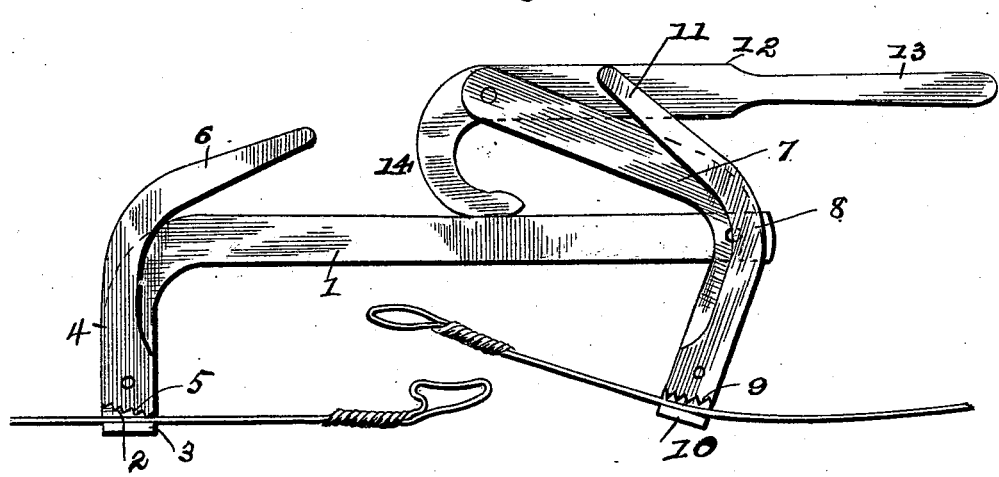

In the drawings:—Figure 1 is a perspective view of the improved device showing it as applied to a bale wire and as ready to untie the same. Fig. 2 is a side elevation of the device showing it in position to loosen the wire or tie, and the parts of the said tie as disconnected.

Similar numerals of reference are employed to indicate corresponding parts in the several figures.

Referring to the drawings the numeral 1 designates the main supporting bar having one end thereof curved and depending to form a jaw 2 which is provided with a lower right angular extension or shoulder 3. To the said jaw 2 is pivotally connected a jaw 4 having a lower serrated head 5 and an upper operating handle 6. To the opposite end of the main bar 1, is pivotally connected an elbow arm 7, the pivot thereof being located at the elbow of the same and to the lower end of the said arm 7 is pivotally attached the lower part of a jaw 8, having a lower serrated head 9 which co-acts with a lower right angular projection or shoulder 10, the upper part of said jaw 8 being also formed with a handle 11, similarly to the jaw 4, heretofore set forth. To the upper inner end of the arm 7, is pivotally connected an operating lever 12, having an outer grip or handle 13, and an inner eccentric curved head 14, adapted to bear on the upper edge of the bar, 1.

In operation the right angular projections or shoulders 3 and 10, are placed under the wires adjacent to the ties thereof and on opposite sides of the latter, the serrated heads of the jaws 4 and 8 being brought to bear firmly upon the wire and their gripping tension increased when the device is operated. The operating lever 12 is then gradually raised and drawn over from one side to the other to cause the eccentric head thereof to force the handle 10 upwardly as shown in Fig. 2, and thereby produce a great tension or stress on the bale wire sufficiently to release the tie, and requiring a very small amount of applied power. Of course the several parts of the device where necessary, will be properly tempered or hardened and in operation the wires or ties are not injured in the least and are adapted to be again used if so desired.

It will be obviously apparent that many minor changes in the proportion and details of construction of the several parts might be made and substituted for those shown and described, so long as they are within the scope of the invention, without departing from the nature or spirit of the latter.

Having thus described the invention, what is claimed as new is—

1. In a device for the purpose set forth, the combination of a main bar having a jaw at one end thereof, an elbow arm pivotally attached to said main bar and carrying another jaw and an operating lever pivotally attached to said elbow arm, and having an eccentric head at its inner end adapted to engage the said bar, substantially as described.

2. In a device of the character set forth, the combination of a main bar having one end thereof depended and formed into a jaw, another jaw pivotally connected to said depended end, an elbow arm pivotally connected to the opposite end of said bar, and having the lower part thereof formed as a jaw, another jaw pivoted to said elbow arm, the jaws pivoted to said elbow arm and to said depended end of the bar being formed with serrated heads and the elbow arm having an upper extended handle, and an operating lever eccentrically attached to the elbow arm and having a segmental head, the latter engaging the upper edge of the bar, substantially as described.

In testimony whereof I have signed this specification in the presence of two subscribing witnesses.

OLIVER C. FRAME.

Witnesses:
W. J. TEESDALE,
C. E. BROOKS.